US012481279B2

(12) United States Patent
Joly et al.

(10) Patent No.: US 12,481,279 B2
(45) Date of Patent: Nov. 25, 2025

(54) EDGE COMPUTING AUTONOMOUS VEHICLE INFRASTRUCTURE

(71) Applicant: International Business Machines Corporation, Armonk, NY (US)

(72) Inventors: Nicolas Jean-Baptiste Joly, Brooklyn, NY (US); Daniel De Souza Casali, Elmhurst, NY (US); Abhishek Jain, Baraut (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 544 days.

(21) Appl. No.: 17/116,064

(22) Filed: Dec. 9, 2020

(65) Prior Publication Data
US 2022/0179411 A1 Jun. 9, 2022

(51) Int. Cl.
G01C 21/34 (2006.01)
G05D 1/00 (2006.01)
G06F 9/50 (2006.01)

(52) U.S. Cl.
CPC ......... *G05D 1/0027* (2013.01); *G05D 1/0088* (2013.01); *G05D 1/0212* (2013.01); *G06F 9/5077* (2013.01); *G06F 2209/502* (2013.01)

(58) Field of Classification Search
CPC ....... B60W 2050/065; B60W 2556/45; B60W 2556/50; B60W 2556/65; B60W 50/06;
(Continued)

(56) References Cited

U.S. PATENT DOCUMENTS 7,266,532 B2 * 9/2007 Sutton .................... H04L 9/40
706/14
9,632,502 B1 * 4/2017 Levinson ............. G08G 1/166
(Continued)

FOREIGN PATENT DOCUMENTS

CN 107211007 A 9/2017
CN 108985485 A 12/2018
(Continued)

OTHER PUBLICATIONS

Authors et al., Disclosed Anonymously, Method and System for Enabling Communication of Autonomous Vehicles Based on a Dynamic Priority Score, ip.com, IPCOM000258643D, 5 pages, May 31, 2019.

(Continued)

*Primary Examiner* — Matthew J. Reda
(74) *Attorney, Agent, or Firm* — Robert R. Aragona

(57) ABSTRACT

A computer resource disparity is detected. The computer resource disparity is related to performing a computing task. The computer resource disparity is located proximate to a first location. A set of one or more autonomous vehicles capable of being adjacent to the first location is identified. An autonomous vehicle computing inquiry is generated. The inquiry is generated based on the first location and based on the computer resource disparity. The autonomous vehicle computing inquiry is transmitted based on the first location. An autonomous vehicle status is received in response to the autonomous vehicle computing inquiry that includes a set of one or more computing resources of the set of autonomous vehicles. A first autonomous vehicle of the set of autonomous vehicles is assigned to perform the computing task. The assignment is based on the set of computing resources of the set of autonomous vehicles.

6 Claims, 7 Drawing Sheets

(58) Field of Classification Search
CPC ... B60W 60/00; G05D 1/0027; G05D 1/0088; G05D 1/0212; G06F 2209/502; G06F 9/5027; G06F 9/5077; G06Q 50/40; H04L 12/14; H04L 12/1407; H04M 15/66; H04M 15/8033; H04M 15/8038; H04W 4/021; H04W 4/023; H04W 4/24; H04W 4/44; H04W 4/50

See application file for complete search history.

(56) References Cited

U.S. PATENT DOCUMENTS

| | | | |
|---|---|---|---|
| 10,185,323 | B2 | 1/2019 | Stefan |
| 10,207,590 | B2* | 2/2019 | Obaidi .................... B60L 53/12 |
| 10,310,500 | B1* | 6/2019 | Brady ..................... B60L 58/12 |
| 10,424,196 | B1 | 9/2019 | McEnroe et al. |
| 10,613,791 | B2 | 4/2020 | Meister et al. |
| 10,637,142 | B1 | 4/2020 | Tran et al. |
| 10,956,211 | B2 | 3/2021 | Wright |
| 11,038,894 | B2 | 6/2021 | Beiter |
| 2017/0091766 | A1 | 3/2017 | Venugopalan et al. |
| 2018/0020005 | A1 | 1/2018 | Beiter |
| 2018/0211541 | A1* | 7/2018 | Rakah ................ G06Q 10/0631 |
| 2018/0348772 | A1* | 12/2018 | Stefan ................ G01C 21/3438 |
| 2020/0272509 | A1* | 8/2020 | Wright .................. G06F 9/5038 |
| 2020/0312153 | A1* | 10/2020 | Thakur .................. G05D 1/227 |
| 2020/0334470 | A1* | 10/2020 | Abeykoon ............. G06V 10/96 |
| 2021/0027391 | A1* | 1/2021 | Levin .................. G06Q 30/018 |
| 2021/0297878 | A1* | 9/2021 | Mondragon ............. G06N 3/08 |

FOREIGN PATENT DOCUMENTS

| | | |
|---|---|---|
| CN | 112000458 A | 11/2020 |
| CN | 113016201 A | 6/2021 |
| WO | 2022/121685 A1 | 6/2022 |

OTHER PUBLICATIONS

Authors et al., Disclosed Anonymously, Method and Control Arrangement for Avoiding a Vehicle Platoon to Interfere with an Emergency Vehicle, ip.com, IPCOM000257619D, 28 pages, Feb. 25, 2019 Feb. 25, 2019.

Authors et al., Disclosed Anonymously, Method and System for Providing Conflict-Free and Stopping-Free Traffic Management of Drones Using On-Board Logic and Peer-to-Peer Communication, ip.com, IPCOM000253225D, Mar. 14, 2018.

TIA® Position Paper, Edge Data Centers, Telecommunications Industry Association, 26 pages, 2018.

Johnson, W. et al., "5G Edge Computing Whitepaper", 12 pages, [No Date Listed on Ref.].

"5G at the Edge", 5G Americas Whitepaper, 59 pages, 5G americas™, Oct. 2019.

Mell, P. et al., "The NIST Definition of Cloud Computing", Recommendations of the National Institute of Standards and Technology, NIST Special Publication 800-145, 7 pages, Sep. 2011.

International Appl. No. PCT/CN2021/132682. (Filed Nov. 24, 2021). Notification of Transmittal of the International Search Report and the Written Opinion of the International Searching Authority. (9 pgs) mailed Feb. 22, 2022.

* cited by examiner

EDGE COMPUTING AUTONOMOUS VEHICLE INFRASTRUCTURE

BACKGROUND

The present disclosure relates to autonomous vehicles, and more specifically, to more efficient usage of computing resources of autonomous vehicles.

Computer systems may have computing resources. For example, computing resources may include memory, processing, and input/output resources. Client devices of a network may be computer systems that have limited computing resources and may have inefficiencies performing computing tasks without access to computing resources.

SUMMARY

According to embodiments, disclosed are a method, system, and computer program product.

A computer resource disparity is detected. The computer resource disparity is related to performing a computing task. The computer resource disparity is located proximate to a first location. A set of one or more autonomous vehicles capable of being adjacent to the first location is identified. An autonomous vehicle computing inquiry is generated. The inquiry is generated based on the first location and based on the computer resource disparity. The autonomous vehicle computing inquiry is transmitted based on the first location. An autonomous vehicle status is received in response to the autonomous vehicle computing inquiry that includes a set of one or more computing resources of the set of autonomous vehicles. A first autonomous vehicle of the set of autonomous vehicles is assigned to perform the computing task. The assignment is based on the set of computing resources of the set of autonomous vehicles.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
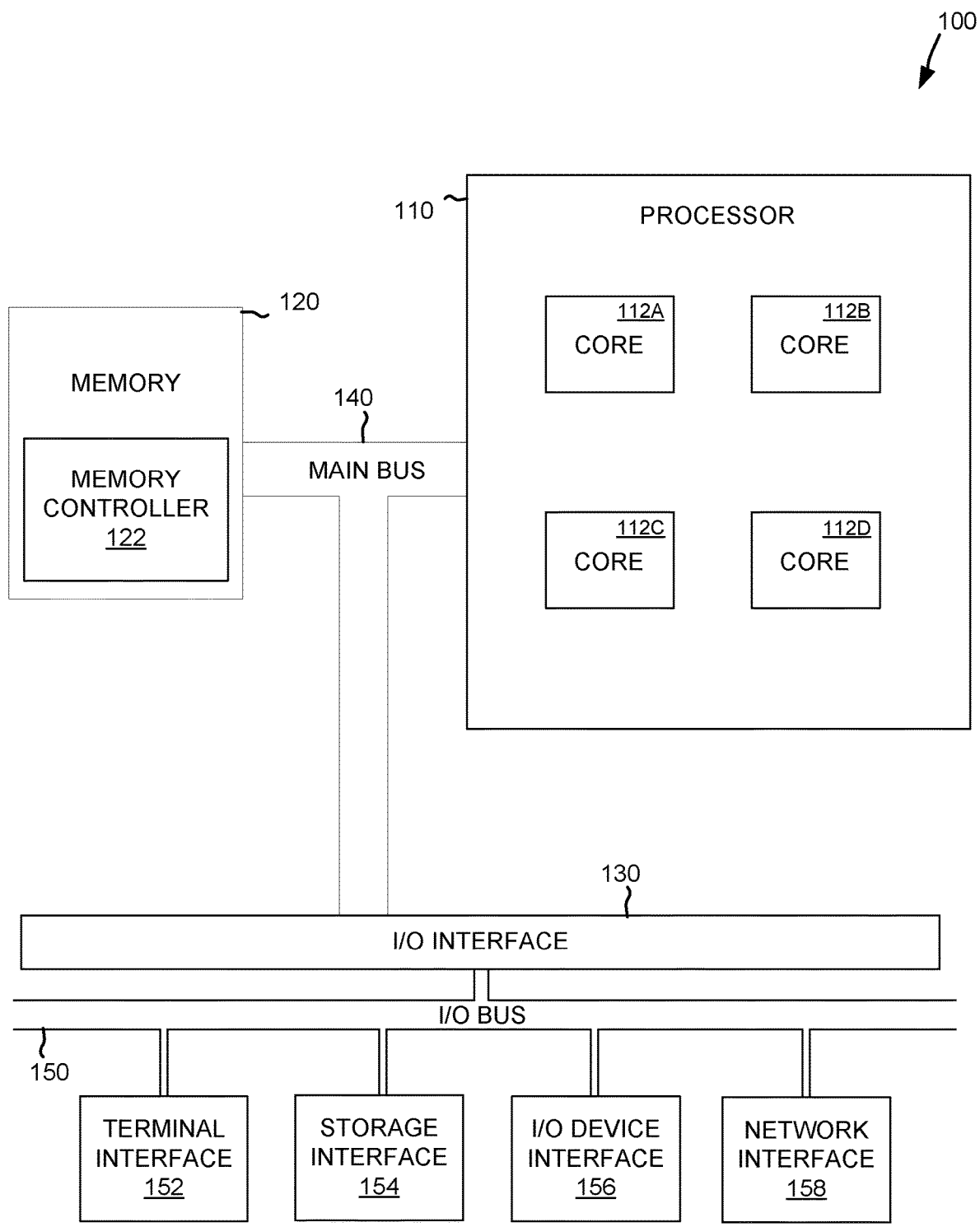
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to autonomous vehicles; more particular aspects relate to more efficient usage of computing resources of autonomous vehicles. While the present disclosure is not necessarily limited to such applications, various aspects of the disclosure may be appreciated through a discussion of various examples using this context.

Computer systems may have computing resources. For example, computing resources may include memory, processing, input/output (I/O), and power source resources. Computing resources may include the amount of memory, processing, I/O, and/or power source resources available to perform computing tasks. Computing resources may include the type of memory, processing, I/O, and or power source resources available to perform a computing task. For example, a particular type of neural networking operation or other machine learning technique may require the use of a particular multicore processor, or a specific graphical processing unit.

Computing has become a pervasive part of everyday life for many. Specifically, various categories of client devices have become popular for performing the various types of operations that are used for new and interesting situations. A client device may be a computer system, such as a smartphone, an Internet of Things (IoT) sensor, a smart applicant, a virtual reality (VR) or augmented reality (AR) device, wearable computing devices, or another everyday device that has integrated computing resources. The client devices may allow for users to perform computing tasks that were previously unavailable. For example, a user may be able to move through an environment such as a park or a city street while using an AR device. The AR device may render an augmented scene and may provide more context for the environment. Further, the AR device may coordinate information that it is compositing into the augmented scene with other client devices including an IoT device placed in the park that measures humidity and temperature.

Client devices may have drawbacks compared to other types of computer systems. Specifically, client devices may be computer systems that have limited computing resources or other capabilities. For example, a smartphone may have a single or dual core processor, a small amount of Random Access Memory (RAM), and/or a limited power source (such as a small internal battery). The smartphone may have inefficiencies performing computing tasks without access to additional computing resources. The smartphone may attempt to render an augmented view for an AR device that is worn on the head of a user, but the rendered augmented view may include lag or stuttering, which may disorient the user of the AR device. In another example, a tablet computer may have a limited graphics processing unit (GPU) and a user may wish to perform computational operations with the tablet computer, but the computational operations may be done slowly or not at all. Consequently, client devices may have limited or nonexistent ability to perform certain computing tasks. Further, the needs of client devices may be increasing. For example, needs may fluctuate based on population density or different other constraints in cities, or with increased remote work trends. The deployment of new network infrastructure (e.g., new cellular networks with increased bandwidth, the ubiquitous installation of Wi-Fi networks) is expected to increase data consumption. Further, new types of computing, such as augmented computing, from these endpoint client devices over the networks may facilitate new uses of client devices by providing reliable and consistent user experience as a result of these added capabilities. For example, a user may consume media on a smart television in the home, the user may then plan to travel on a bus or in a ride sharing vehicle, and may continue to consume the media through a smartphone at the same visual and audio fidelity. One solution to reduce the limitations and inabilities of client devices is to utilize cloud computing to perform, or assist in performing, some or all of the computing tasks for client devices. Cloud computing, in some cases, can be a centralized network of remote servers which provide on-demand availability of computing services or IT resources (such as servers, storage network, database, etc.) from a remote location. For example, a plurality of servers communicatively coupled to the Internet may be available for performing tasks that may otherwise be performed by a smartphone. Cloud computing, however, may have limitations and drawbacks that are technically unable to be overcome. For instance, augmented reality (AR) or virtual reality (VR) environments may rely on a low response time (latency) and large amount of data to provide a satisfactory user experience (high resolution, large field of view, high refresh rate). Another example is real time data acquisition devices (traffic sensors, cameras) for which higher resolution data points could be captured if provided with access to more local storage capacity and then processed by artificial intelligence (AI) algorithms that require more compute power than the acquisition device and communicatively coupled client devices are capable of performing (image processing, decision making, etc.).

Another solution to reduce the limitations and inabilities of client devices is edge computing. Edge computing is a field of technology where one or more edge compute nodes may be configured to perform operations for client devices. The edge compute nodes include resources such as compute and storage. Edge computing may have an advantage in certain situations, such as for low latency needs, because the edge compute nodes may be positioned or deployed geographically close to the end users (as opposed to distant centralized servers in the cloud computing). For example, a Content Delivery Network (CDN) may identify that a particular video stream is popular at a certain location. In response to this, the CDN may attempt to place edge compute nodes near the location to facilitate the consumption of the popular video stream. Another advantage of edge computing may be in the number of operations a client device may need to perform (compared to cloud computing) to reach the computing resources from the server. Edge computing distributes these data processes across different locations. This makes the data deliverable to the nearest edge computing node and/or processing of the computing tasks at the edge computing node.

Edge computing, however, may suffer from a number of drawbacks. For example, edge computing may not be as powerful as cloud computing in certain situations. The number and configured type of edge compute nodes may be limited because it may be technically impossible to locate and place all of the required processing at each location. Certain processors, GPUs, or specially designed and configured application specific integrated circuits (ASICS s) may be efficiently located at a central server of a cloud computing server, but these computing resources may not be able to be located at each needed endpoint (e.g., near client devices). Further, edge computing may be reliant on determining the location of where computing resources are needed for computer task performance. However, the ability to predict accurately and dynamically where compute needs of future task performance may be and how to allocate resources accordingly is not doable with current technology. Further, edge computing may not have each tool for every circumstance that may arise. For example, a certain type of computing may be processor-intensive at a first location at a first time, but the type of deployed edge compute nodes may be storage focused at the first location at the first time. Continuing the example, at a later time, the type of computing tasks may change, and edge computing nodes may take time and manpower to deploy and configure appropriately.

An edge computing autonomous vehicle infrastructure (ECAVI) may alleviate the various issues and drawbacks to providing computing resources to client devices. ECAVI may utilize the computing resources of autonomous vehicles to provide edge computing resources. The ECAVI may operate without impacting the function or operation of autonomous vehicles. Specifically, an edge computing autonomous vehicle controller (ECAVC) may be configured to determine the current resource usage of one or more autonomous vehicles, and based on identifying free resources, assign, allocate, or otherwise distribute the resources for use by client devices. The ECAVI may operate in real-time, near real-time (e.g., minutes, seconds), or predictively (e.g., based on the analysis of processing, network, and data-usage trends) to assign computing resources of autonomous vehicles to the performance of computing tasks.

ECAVI may be configured to provide technical benefits, such as reduce usage of dedicated edge compute nodes compared to an edge computing technology. The ECAVI may also reduce latency and/or reliance on central servers provided by cloud computing and CDNs. The ECAVI may deploy computing resources that are lowlatency and high-performance quickly and to targeted locations that have specific computing tasks. Specifically, various autonomous vehicles may be travelling in a location (e.g., a city). The technology of autonomous vehicles may be used in a burst nature (e.g., only a subset of autonomous vehicles may be using the full computing resources that are built into the autonomous vehicles) to ensure a seamless and coherent public transportation.

Specifically, the ECAVI may form a platform that works with existing autonomous driving platforms and ride share platform to enable the dispatch of cars (therefore the dispatch of resources) where the existing infrastructures of edge computing are in high demand. For example, autonomous vehicles will be travelling in various parts of an example city. A central vehicle platform may manage the flow of an autonomous vehicle system based on the public transport requirement in the example city. The ECAVI may operate in conjunction with the central vehicle platform, to coordinate autonomous vehicles, not only for transportation, but also based on usage of the built-in computing resources of the autonomous vehicles for client devices also located in the example city.

Each autonomous vehicle may be configured as part of their inherent design with one or more computing resources that may be leveraged by the ECAVI. Specifically, autonomous vehicles may be configured with a set of computing resources capable of performing tasks for client devices. For example, the operation of autonomous driving by autonomous vehicles may be based on specialized and general-purpose processors, such as central processing units (CPUs) and GPUs. These processors may be configured to perform many (e.g., dozens, hundreds, thousands or more) operations per second related to heavily compute-focused tasks such as image processing, object detection, video processing, transcoding and broadcasting capabilities, and the like. The autonomous vehicles may also include dozens of sensors and cameras that are configured to capture an environment that is to be processed by the vehicles. Moreover, the autonomous vehicles may include large amounts of primary storage (e.g., random access memory (RAM)) and secondary storage (e.g., solid state drives, hard drives), and the like. Further, the autonomous vehicles may also include various network interfaces (e.g., vehicle-to-vehicle networks, cellular networks) and particular specialized networking functionalities (e.g., Wi-Fi access points).

The ECAVI may be configured to leverage the autonomous vehicles and the related centralized vehicle platforms. The ECAVI may operate with a CDN or computing resource provider. The ECAVI may be configured to augment processing or data capacity needs where appropriate. For example, if a number of users are at a sporting event and each user has an AR device, the ECAVI may be configured to host the networking infrastructure of the AR devices. Further, the ECAVI may be configured to provide other operations in real-time to the users at the sporting event. For example, data storage of various objects (such as AR object polygonal models), and processing (such as running image detection algorithms to align the AR models within a real-world space of the field of the sporting event). The ECAVI may respond quicker and with more appropriate computing resources for these type of tasks, and may be able to scale to temporary spikes in demands, such as a computer resource disparity (e.g., a lack of memory, storage, processing, and/or I/O computing resources). The ECAVI may also facilitate the offloading of processing, storage, and streaming from both client devices, cloud servers, CDNs and other computing providers.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
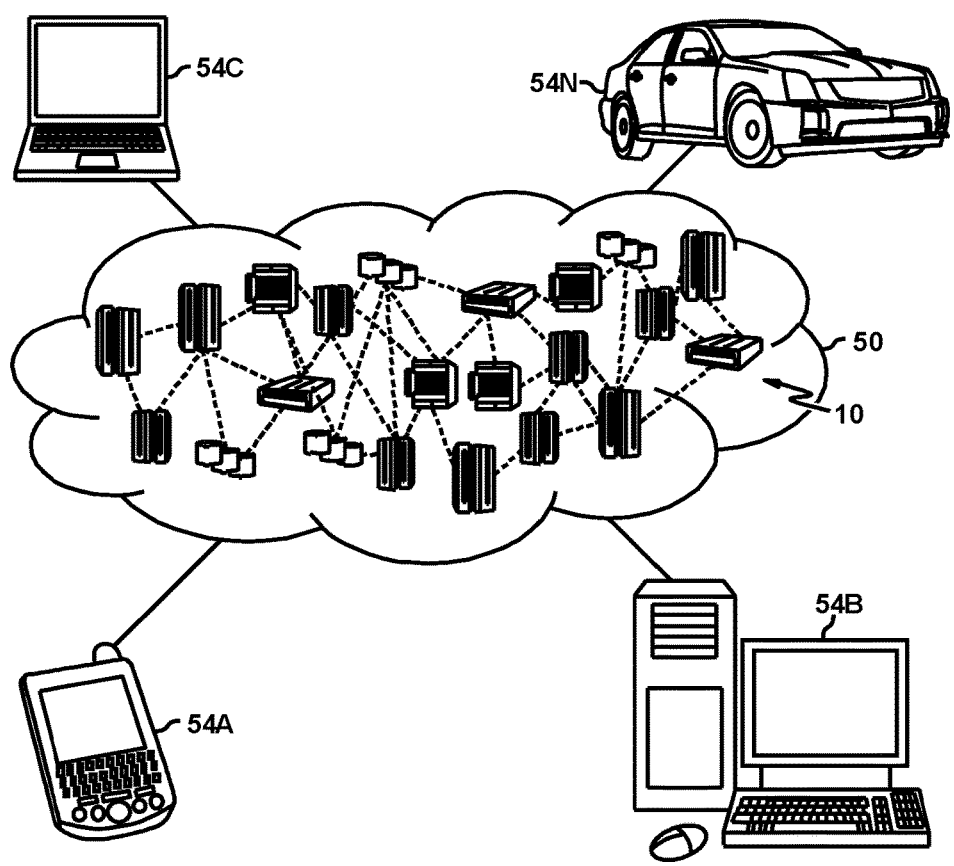
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
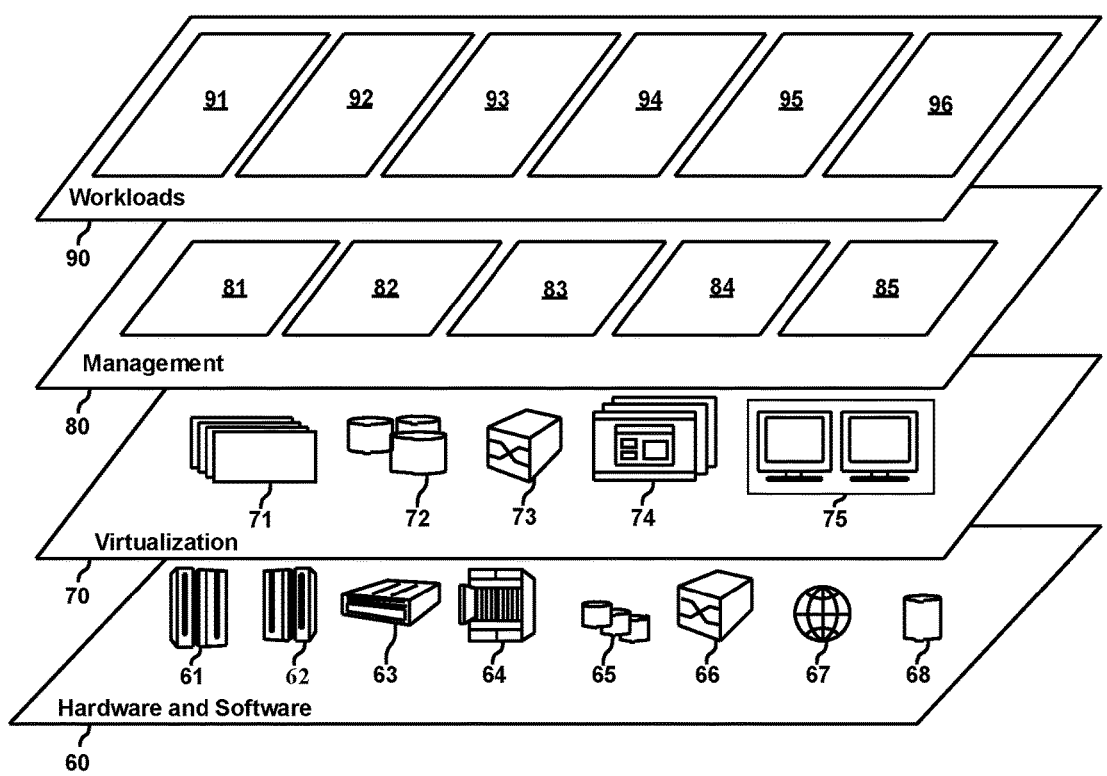
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ECAVI 96.

Figure 4A:
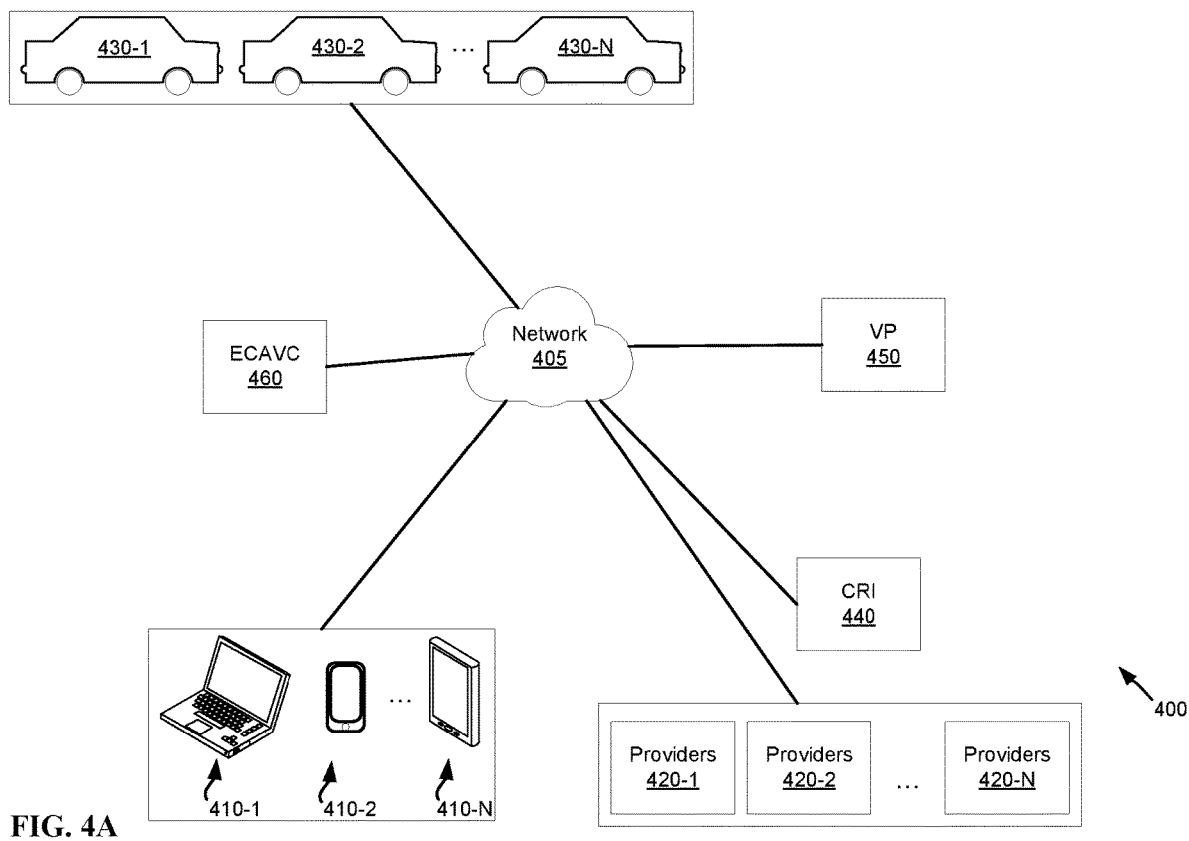
FIG. 4A depicts an example system of performing edge computing based on autonomous vehicle infrastructure, consistent with some embodiments of the disclosure.

FIG. 4A depicts an example system 400 of performing edge computing based on autonomous vehicle infrastructure, consistent with some embodiments of the disclosure. FIG. 4A may include at least the following: a plurality of client devices 410-1, 410-2, up to 410-N; a plurality of computing resource providers 420-1, 420-2, up to 420-N (collectively, providers 420); a set of autonomous vehicles 430-1, 430-2, up to 430-N (collectively, vehicles 430); at least one content resource intermediary (CRI) 440, a vehicle platform (VP) 450, and an edge computing autonomous vehicle controller (ECAVC) 460. At least one network 405 may be configured to communicatively couple the other components of system 400. The network 405 may be a wide area network, such as the Internet. The network 405 may be a shortrange network, such as a vehicle-to-vehicle network. The network 405 may be a series of networks, such as a wireless local area network between client device 420-2 and autonomous vehicle 430-1, and a second network that is configured as a wide area network between the client device 420-2 and the content resource intermediary 440.

The client devices 410 may be one or more computers, portable computers, smartphone, and the like. The client devices 410 may be configured to respond to user requests and may be configured to perform one or more computing tasks or portions of a computing task. For example, client device 410-2 may be configured to stream a video from a web browser application that is executed by the client device 410-2. Each of the client devices 410 may have limited processing, memory, storage, battery, I/O bandwidth, or other computing resources. The client devices may have computer resource disparities in relation to a task they are requested to perform. For example, client device 410-1 may be configured to perform a machine learning task, however the client device 410-1 may not have sufficient memory or processing power to perform the computing task.

The computing resource providers (providers) 420 may be entities configured to host or serve various computing needs. The providers 420 may be computer servers that are located distant from one or more of the client devices 410. For example, the providers 420 may have a server farm or other infrastructure located in a neighboring city or across the country from any of the client devices 410. The providers 420 may store data such as media for consumption by client devices 410. The providers 420 may have or run a cloud computing platform or an edge computing platform. For example, one or more of the providers 420 may be located centrally at a server distal from any of the client devices 410. In another example, one or more of the providers 420 may be located only near a single client of the client devices 410 but may not be near all of the client devices. The providers 420 may contain specialized hardware, general purpose computer hardware, specialized or provider specific algorithms (e.g., smartphone apps, desktop publishing applications, machine learning algorithms) or content (e.g., streaming video or music) for consumption.

The autonomous vehicles 430 may be a plurality of autonomous vehicles configured with a set of computing resources. In some embodiments, system 400 may be configured to operate with a single (i.e., one) autonomous vehicle (e.g., autonomous vehicle 430-1). The autonomous vehicles 430 may be configured to receive passengers and perform one or more transportation operations throughout various locations. For example, autonomous vehicle 430-1 may be a privately owned autonomous vehicle configured to drive an owner to a destination of the owner's choosing. In another example, autonomous vehicle 430-2 may be a vehicle owned by a ridesharing or taxi-cab company, configured to accept requests from users or from a central server of the company.

The CRI 440 may be an additional computing platform configured to facilitate the consumption of processing or services of the providers 420. For example, CRI 440 may be a content delivery network that contains copies of digital audio or video files for consumption by users. The CRI may facilitate the hosting and transmission of the content to a plurality of other computers, such as client devices 410. The CRI 440 may be an edge node resource configured to accept resource requests. For example, CRI 440 may be an edge computing node located at a first location, and hosting processing operations for one or more of the providers 420 and/or client devices 410.

The VP 450 may be a centralized or fixed location computing node of an autonomous vehicle provider. For example, VP 450 may be a server of a manufacturer of various autonomous vehicles including a subset of the autonomous vehicles 430. The manufacturer may store at VP 450 route, guidance, location, speed, vehicle status, or other information related to the subset of the autonomous vehicles 430. In another example, VP 450 may be a server of a ride-sharing service that operates in conjunction with a subset of the autonomous vehicles 430.

The ECAVC 460 may be configured to perform one or more operations and interact with the other components of the system 400. ECAVC 460 may be configured as a single computer system, such as computer system 100. ECAVC 460 may be a part of a cloud computer, such as cloud computer environment 50. The ECAVC 460 may be configured to route and respond to requests for resources in response to computer resource disparities of the client devices 410.

In detail, one or more of the set of autonomous vehicles 430 may be present in different locations. The ECAVC 460 may instruct the computing resources of the autonomous vehicles 430 to host processing and/or precache data for edge computing needs. The autonomous vehicles 430 may perform the computing resources with resources that are not necessary or otherwise separate from regular transportation (e.g., performing autonomous driving). Each autonomous vehicle 430 may be considered a micro-mobile data center node in the smart city configured by the ECAVC 460 to provide edge computing for the client devices 410.

The ECAVC 460 may be configured to instruct, allocate, assign, or otherwise partition the various computing resources of the autonomous vehicles 430, based on the consumption of computing resources from the providers 420 and/or the CRI 440. The ECAVC 460 may assign and re-assign the computing resources of the autonomous vehicles 430 based on changing needs and during transportation operations of autonomous vehicles. For example, an autonomous vehicle 430-1 may be assigned to perform a first task for client device 410-1. Later, autonomous vehicle 430-1 may be assigned to perform a first task for client device 410-2. Yet still later, autonomous vehicle 430-1 may be assigned to perform a second task for client device 410-1.

The ECAVC 460 may be configured to predict a pattern of computer resource usage in a certain location. In some embodiments, the ECAVC 460 may execute machine learning on data using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Responsive to an identified pattern, the ECAVC 460 may be configured to assign computing resources before there is a determined disparity, such as a future computing task to be performed for a client device 410. For example, a pattern of usage is identified of client devices 410 in a first location, and a particular computer task event (e.g., a community gathering to play a shared online game). Based on determining the event will happen in the future, the ECAVC 460 may be configured to instruct autonomous vehicle 430-2 to store one or more assets, or precache certain routings for execution at the time of the event. The autonomous vehicle 430-2 may have free storage resources. The free resources of an autonomous vehicle 430-2 may not overlap with the type and/or amount of computing resources used for autonomous movement by the autonomous vehicle. The autonomous vehicle 430-2 can perform edge computing for the client devices 410 at the first location and at the same time safely navigate along a route that is proximate or within a radius of the first location during the event.

The ECAVC 460 may be configured to apportion or allocate computing resources of a plurality of autonomous vehicles 430 for a single computing task. For example, the ECAVC 460 may determine by transmitting an autonomous vehicle inquiry the availability and computing resources. Responsively, autonomous vehicles 430-1 and 430-2 may be passing by a first location (at a first time and a second time, respectively). The first location may be where an identified resource disparity exists for client device 410-1. Based on the movement of autonomous vehicles 430-1 and 430-2 from one location to another location proximate to the first location, cached data and to-be performed computing algorithms may be transferred from autonomous vehicle 430-1 to autonomous vehicle 430-2, so that the autonomous vehicles 430-1 and 430-2 can collectively perform edge computing. Simultaneously the autonomous vehicles 430 may be communicating to the VP 450, the ECAVC 460, or each other, so that the autonomous vehicles 430 can provide required location specific data during edge computing.

The ECAVC 460 may coordinate with the autonomous vehicles 430 and/or the VP 450 to direct the autonomous vehicles 430 for transportation functions and for computing resource functions. For example, a first autonomous vehicle 430-1 may be performing autonomous movement along a first route for a user that is riding in the autonomous vehicle 430-1. The first route may facilitate the user to arrive at the proper location within a set duration (e.g., 30 minutes). The ECAVC 460 and/or the VP 450 may reroute the autonomous vehicle 430-1 to travel along a second route that is adjacent, proximate, or otherwise near client device 410-1 to facilitate the performance of a computing task for the client device. The second route may prioritize the computing task over autonomous movement (e.g., the second route may be towards more traffic, the second route may be a longer duration, the second route may take the autonomous vehicle a longer duration of 35 minutes to complete).

In some embodiments, the ECAVC 460 may operate, alone or in conjunction with the VP 450, to affect the availability of computing resources of the autonomous vehicles 430. For example, if a high data caching or imminent compute processing requirement is detected in a first location, the ECAVC 460 may communicate with the VP 450 and may request information on available autonomous vehicles 430 in a region or radius around the first location. If there are no autonomous vehicles 430 located in the or around the first location, the ECAVC 460 may generate in conjunction with the VP 450 autonomous ride sharing incentives. The incentives may include adjusting the rates or otherwise generating autonomous ride sharing demand near the first location, to cause one or more of the autonomous vehicles 430 to move towards the first location.

In some embodiments, the ECAVC 460 may coordinate with the CRI 440 or the providers 420 to utilize computing resources that are cached at one or more proximate autonomous vehicles 430. For example, a person riding in autonomous vehicle 430-1 may be operating client device 410-1. Autonomous vehicle 430-1 may host a subset of music that is a part of a content library of provider 420-1, and simultaneously the person riding in the autonomous vehicle may be navigating a music streaming service on client device 410-1. The ECAVC 460 may instruct client device 410-1 and/or the music streaming service to surface, filter, rearrange, suggest, recommend, or otherwise promote the subset of music that is cached by autonomous vehicle 430-1. In another example, autonomous vehicle 430-2 may be parked at a parking lot adjacent to a first location where client device 410-2 is actively playing a VR game. The VR game may include assets generated or hosted by provider 420-2 and pseudorandomly presented to a user of client device 410-2. Autonomous vehicle 430-2 may receive a signal from ECAVC 460, and responsively may present itself for performing one or more of the rendering or computing tasks of the VR game for the client device 410-2 to reduce processing power required by client device 410-2. Additionally, the VR game may adjust the random nature of the presented assets, based on cached copies of the assets stored by autonomous vehicle 430-2.

In some embodiments, the system 400 may be configured to manage assignment of computing tasks based on autonomous vehicle capabilities. In detail, the ECAVC 460 (e.g., by request), and/or the VP 450 (e.g., by broadcast) may communicate with each other to identify one or more of the computing resources of each autonomous vehicle 430 that may be adjacent or proximate to a particular location of a computer resource disparity. For example, the resources may include a given autonomous vehicle's 430 data storage capability; the data storage capacity can be decided based on volume of data that is required to provide required service to the different data consumption needs. In another example, the resources may include a given autonomous vehicle's 430 cooling mechanism, whether it can be air cooling or any other cooling method to cool processing and data storage by the on-board computing resources of the autonomous vehicle. In yet another example, the resources may include a given autonomous vehicle's 430 network connectivity and capabilities to transfer data from/to the providers 420 and/or the client devices 410 and the latency of such transfer. In yet still another example, the resources may include a given autonomous vehicle's 430 model/brand to identify other features of the computing resources, such as data deduplication, compression, data partitioning and enabled security mechanisms.

In some embodiments, the system 400 may be configured to determine a route of an autonomous vehicle. In detail, the ECAVC 460 (e.g., by request), and/or the VP 450 (e.g., by broadcast) may communicate with each other to identify any necessary needs of client devices 410 in relation to the location and route of the autonomous vehicles 430. For example, the ECAVC 460 may identify time sensitive data using any relevant method, which is to be accessed in a specific location, a particular region of contiguous locations, or along a particular route. The ECAVC 460 may further identify the capabilities and available computing resources of the autonomous vehicles 430 that are near the location, region, or route. Using pattern analysis, the ECAVC 460 may predict types of data that may be required to perform the computing task and may also predict the number of client devices 410 that are anticipated to need to perform the computing task. Using historical learning the proposed system will be predicting how many datacenter nodes are required to provide the required data. Using historical learning, the ECAVC 460 may predict a duration of data consumption in or around a location, region, or route. Based on time sensitive data and historical pattern analysis, the ECAVC 460 may predict the data consumption needed around the location and may also be identifying the actual data consumption needed. Then, a transportation system can identify the appropriate route such that at least one of the autonomous vehicles 430 (based on the requirement of edge computing datacenter nodes for performing computing tasks) have the relevant data.

In some embodiments, the ECAVI 460 may operate in conjunction with the other components of system 400 to secure data and processing executed by a computing task on the autonomous vehicles 430. For example, the ECAVI 460 may be configured to generate one or more entities or related computing constructs of a hypervisor for autonomous vehicle 430-1. Autonomous vehicle 430-1 may responsively generate a partition, container, virtual machine, or other isolated computing construct or secure operating system. The separate partition of the autonomous vehicle 430-1 may not be accessed by the VP 450 or other clients 410, except for an assigned client that requested edge computing of a computing task.

Figure 4B:
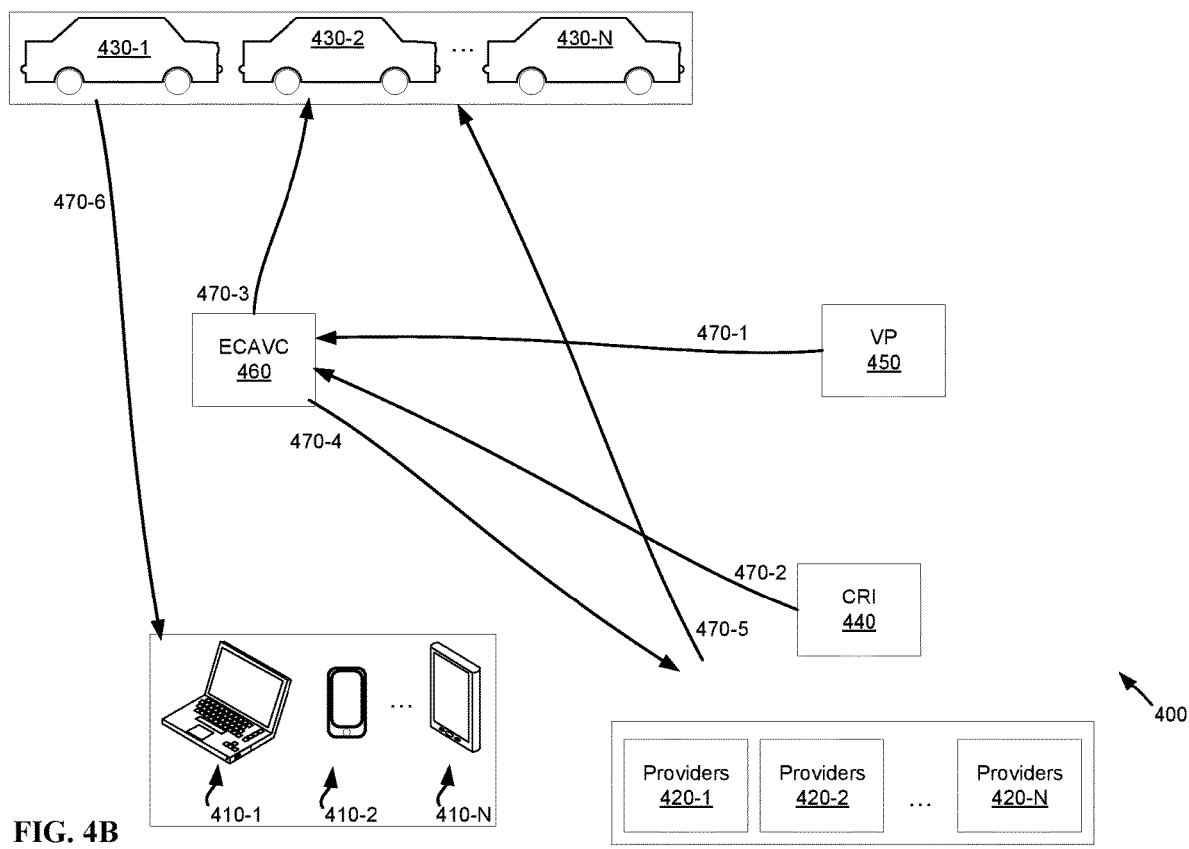
FIG. 4B depicts an example first process of various operations and data movement through the example system, consistent with embodiments of the disclosure.

FIG. 4B depicts an example first process 470 of various operations and data movement through system 400, consistent with embodiments of the disclosure. Process 470 may be embodied as a series of operations that are performed by one or more of the entities of system 400 and transmitted through network 405. First process 470 may include 470-1 where an autonomous vehicle fleet manager may broadcast information regarding one or more of the autonomous vehicles 430 to the ECAVC. The information may include available computing resources of each autonomous vehicle 430 as well as the location of each autonomous vehicle.

The CRI 440 may identify a spike in demand (e.g., a future computer resource disparity) at a particular location (e.g., a concert is happening in an amphitheater). The concert host partners with provider 420-1 to provide augmented reality to the audience through their client devices 410 during the concert. At 470-2, the CRI 440 may contact the ECAVC 460 and place a request for computing resources. Responsively the ECAVC 460 may use the request to determine a resource disparity for performing augmented reality operations (e.g., AR device and associated app running on client devices 410 of users attending the concert may require access to a large catalog of virtual objects with near real-time latency).

The ECAVC 460 may identify, based on the information received at 470-1, a subset of the autonomous vehicles 430 that are available to perform edge computing. The ECAVC 460 may, at 470-3, assign the subset to a CRI 440 (e.g., a CDN node for operating on behalf of the provider 420-1. The ECAVC 460 may adjust periodically, at 470-3, the allocation in real-time to consider the movement of the subset in and out the desired coverage radius of the concert.

The ECAVC 460 may assign, at 470-3, only those resources that are not used or are not critical to resources needed to perform autonomous navigation by the autonomous vehicles 430. At 470-4, the ECAVC 460 may communicate the identity and security information of logical partitions of the subset of autonomous vehicles 430, to the provider 420-1 and/or the CRI 440. Responsively, the provider 420-1 and/or CRI 440 may transmit, at 470-5 the augmented reality data and objects to the identified subset. At 470-6 the subset of autonomous vehicles 430 may host edge computing resources to perform the task of augmented reality object hosting for the client devices 410 during the concert.

Figure 4C:
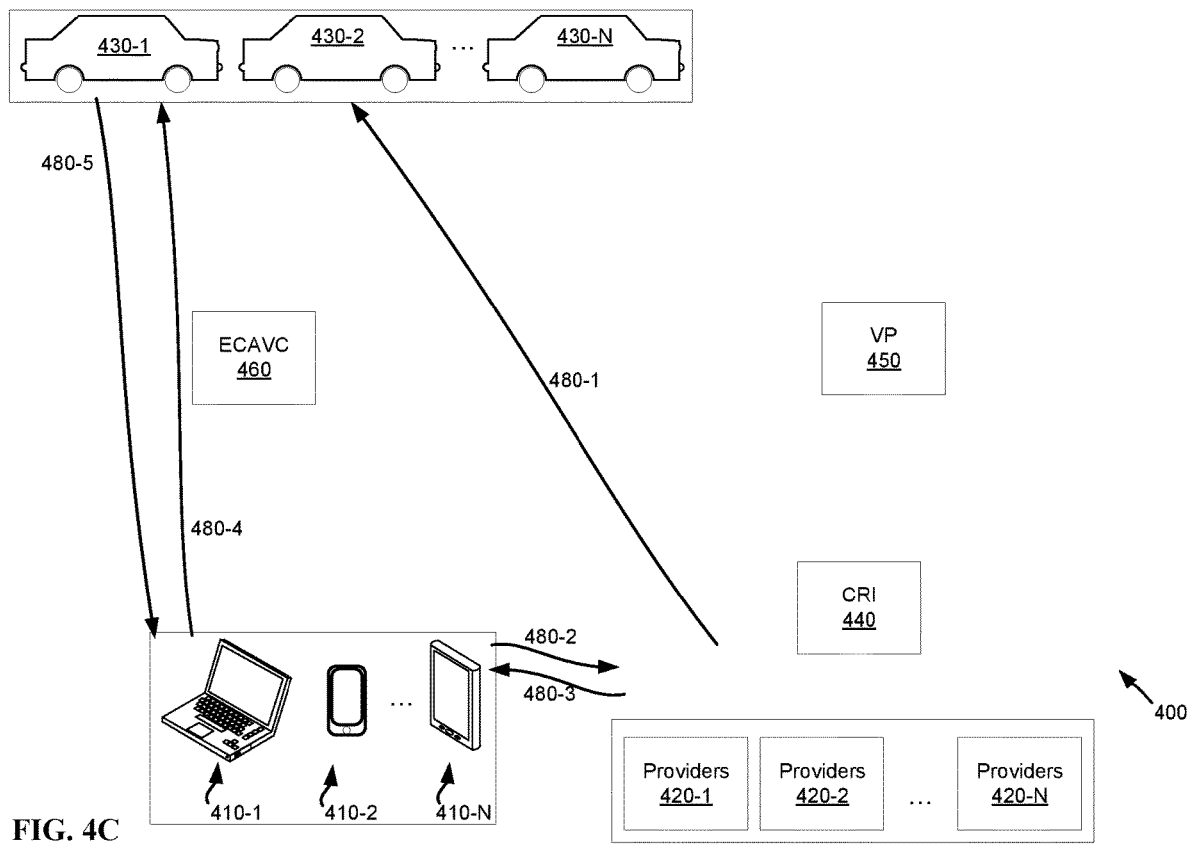
FIG. 4C depicts an example second process of various operations and data movement through the example system, consistent with embodiments of the disclosure.

FIG. 4C depicts an example second process 480 of various operations and data movement through system 400, consistent with embodiments of the disclosure. Process 480 may be embodied as a series of steps that are performed by one or more of the entities of system 400 and transmitted through network 405. Process 480 may be a two-step authentication for access to data and decryption of pre-cached data objects (e.g., access to content). The content may be served and replicated from a source (e.g., a provider 420 or CRI 440). The provider 420 and/or CRI 440 may be the ultimate owner of the data being distributed over privately owned devices depending on contracts and rights to access the data.

The source may transmit, at 480-1, the precached data for later consumption, to one or more edge computing logical partitions that are hosted by a subset of the autonomous vehicles 430. Each autonomous vehicle 430 may not necessarily have, store, or be configured (or technically able) to decrypt, or otherwise access the encrypted cached data that they are hosting.

At 480-2, a client device 410 may make a request for data that is typically held by the provider (e.g., provider 420-2). The request by the client may include a validation token (e.g., a proof of access) for the data. for example, if the data is a software program, the request may include a license key that validates that a given client device 410 has access or permission to access the data. The authentication, by the provider 420 and/or CRI 440, may identify from the validation token, that the client device 410 is authorized to access the data.

At 480-3, the provider 420 and/or CRI 440, may provide a temporary access token in response to validating the validation token. At 480-3, a uniform resource identifier (e.g., an IP address, a URL, a web address, a server MAC address, etc.) may also be provided, at 480-3, in response to validating the validation token. Selection of the uniform resource identifier may be performed by the ECAVC 460. For example, the ECAVC 460 may identify a particular autonomous vehicle 430 that is closer to the client device 410 that initiated the request. The ECAVC 460 may responsively (not depicted), transmit the uniform resource identifier to the provider 420 and/or 440 for transmission to the requesting client device 410.

At 480-4, the client device 410 may make a request for the data hosted on a logical edge partition by the autonomous vehicle 430. The request for the data may include the temporary access token. The request may be directed to the autonomous vehicle based on the uniform resource identifier.

At 480-5, the autonomous vehicle 430 may decrypt and provide the requested content to the requesting client device 410. The operations of 480-5, such as the decryption and transmission of the data requested, may be inaccessible by the autonomous vehicle 430. For example, in response to the autonomous vehicle 430-2 receiving the request as part of 480-4, a container, virtual machine, or other logical partition may be generated or instantiated by autonomous vehicle 430-2. The operations of the logical partition may be separated and may not be viewable by the other components of autonomous vehicle 430-2.

Figure 5:
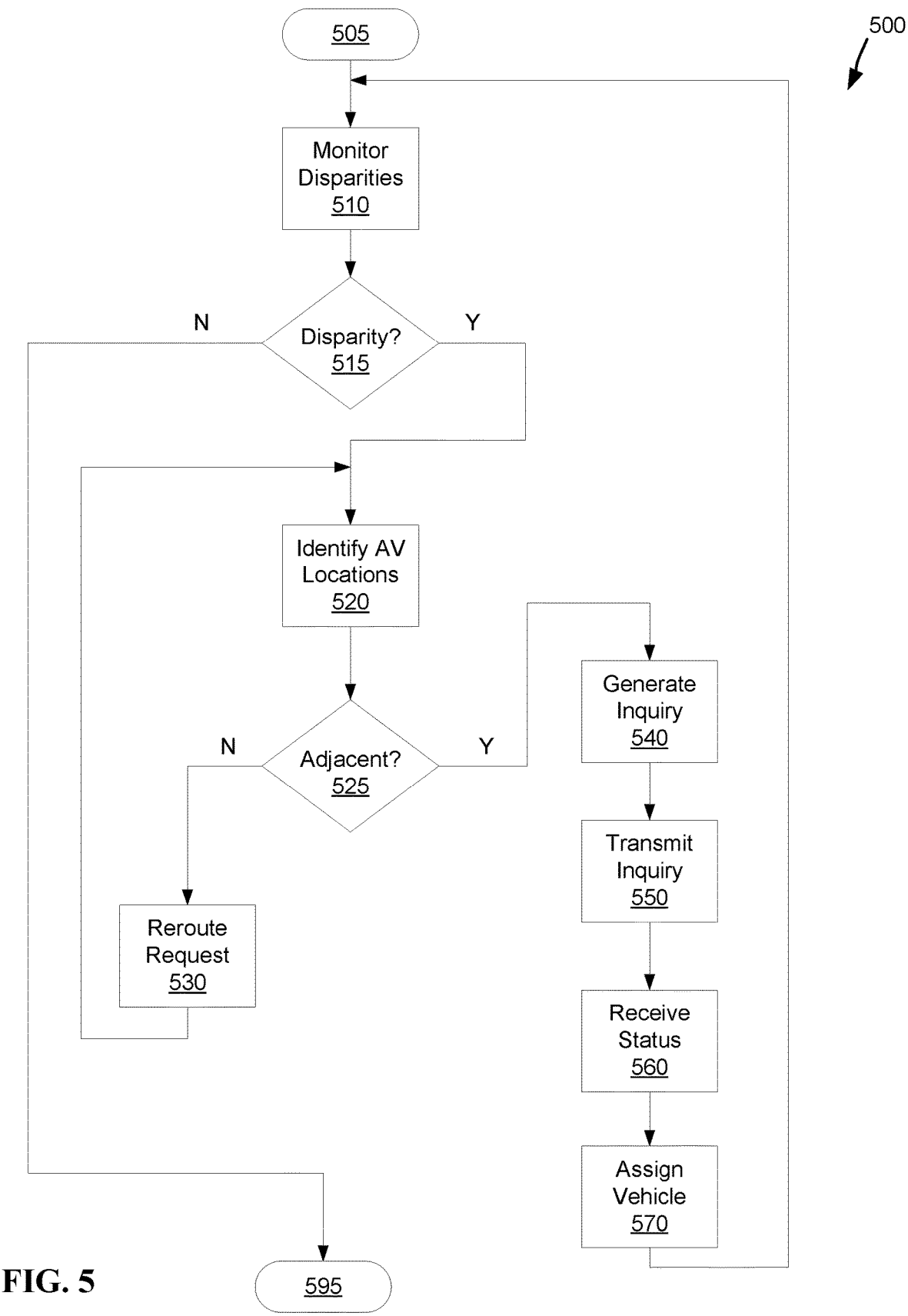
FIG. 5 depicts an example method of performing edge computing using autonomous vehicle computing resources, consistent with some embodiments of the disclosure.

FIG. 5 depicts an example method 500 of performing edge computing using autonomous vehicle computing resources, consistent with some embodiments of the disclosure. Method 500 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). Method 500 may be performed by an ECAVI, such as one or more components of system 400. For example, method 500 may be performed in its entirety by ECAVC 460. In another example, certain portions of method 500 may be performed by ECAVC 460, while other portions may be performed by client devices 410, providers 420, CRI 440, VP 450, and/or one or more autonomous vehicles 430.

From start 505, method 500 begins by monitoring for one or more computer resource disparities at 510. The computer resources disparities may be monitored by listening to requests for computing resources from a client device. The compute resource disparities may be monitored by listening to requests for hosting of computing resources and/or data precaching requests by a provider or content resource intermediary. A computer resource disparity may be a lack of memory for processing by a client device, a lack of processing cycles for processing by the client device, a lack of input/output bandwidth or latency, or other relevant disparity between the number of computing resources needed by a client device to perform a computing task and the number of computing resources that the client device has access to for performing the computing task. Method 500 may continue to listen for or otherwise monitor for computer resource disparities continually. If a computer resource disparity is not detected at 515:N, method 500 may end at 595.

If a computer resource disparity is detected at 515:Y, a set of one or more autonomous vehicles may be identified based on location at 520. Specifically, and by way of example, a set of one or more autonomous vehicles may be identified based on their adjacency, proximity, or present location. The location of the set of autonomous vehicles may be in relation to the location of a client device having a computer resource disparity, as detected at 515. If there are no autonomous vehicles that are adjacent to the location of the computer resource disparity at 525:N, then a reroute request may be sent to a vehicle platform or provider at 530. For example, upon a determination that there are no autonomous vehicles at or near a location of a computer resource disparity, an ECAVC 460, may transmit to VP 450 a reroute request to reroute one or more autonomous vehicles that are in a region or larger radius from the location.

If there is an autonomous vehicle that is adjacent to the location identified at 515:Y, then an autonomous vehicle computing inquiry may be generated at 540. The autonomous vehicle computing inquiry may be generated based on the location of the computer resource disparity and based on the type of computer resource disparity. For example, if a client device is detected (at 515) as lacking sufficient processing power, then the inquiry may be generated that includes a request for processing cycles of a free autonomous vehicle.

At 550, the autonomous vehicle computing inquiry may be transmitted. The autonomous vehicle computing inquiry may be transmitted to a vehicle platform. For example, the inquiry may be sent to a central server of an autonomous vehicle manufacturer that coordinates and provides rendered and organized visualization data for navigation purposes to particular autonomous vehicles located adjacent to the location. In another example, the inquiry may be sent to a ridesharing provider central server that provides and directs various autonomous vehicles of a ridesharing fleet.

At 560 a status of an autonomous vehicle (autonomous vehicle status) may be received based on the inquiry (transmitted at 550). The autonomous vehicle status may include a set of one or more computing resources of the set of autonomous vehicles that are adjacent to the location of computer resource disparity. For example, a listing may be received from an autonomous vehicle manufacturer. The listing may include autonomous vehicles having sufficient storage space to store various numerical data sets that are a part of a machine learning operation, and of the set that are near the location.

At 570 a first autonomous vehicle may be assigned to perform the computing task. The first autonomous vehicle may be selected from the set of autonomous vehicles that are at the location. The first autonomous vehicle may be selected from a set of autonomous vehicles that will soon be at the location. For example, an autonomous vehicle may be selected that is on a route that will put the autonomous vehicle intersecting with the first location in an acceptable time frame to address and/or perform the computing task. The first autonomous vehicle may be assigned the performance of the computing task based on the set of computing resources. For example, only a subset of the set of computing resources returned (as part of the status received at 560) may be identified, selected, and assigned based on having the computing resources to alleviate a part or all of the computer resource disparity.

After a first autonomous vehicle is assigned to perform the computing task, method 500 may continue by monitoring for additional disparities at 510.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system, the system comprising:
    a memory, the memory containing one or more instructions; and
    a processor, the processor communicatively coupled to the memory, the processor, in response to reading the one or more instructions, configured to:
        detect a computer resource disparity for performing a computing task, wherein the computer resource disparity is located proximate to a first location, wherein the computer resource disparity includes a lack of memory for processing by a client device;
        identify a set of one or more autonomous vehicles capable of being adjacent to the first location;
        generate, based on the first location and based on the computer resource disparity, an autonomous vehicle computing inquiry;
        transmit, based on the first location, the autonomous vehicle computing inquiry to a vehicle platform, wherein the vehicle platform is a central server of an autonomous vehicle manufacturer;
        receive, from the vehicle platform, in response to the autonomous vehicle computing inquiry, an autonomous vehicle status that includes a set of one or more computing resources of the set of autonomous vehicles; and
        assign, based on the set of computing resources of the set of autonomous vehicles, a first autonomous vehicle of the set of autonomous vehicles to perform the computing task, wherein the processor configured to assign the first autonomous vehicle to perform the computing task is further configured to:
            based on a determination the first autonomous vehicle is performing movement along a first route for a user riding in the first autonomous vehicle toward a second location, cause the first autonomous vehicle to reroute to travel along a second route that is located proximate to the first location to perform the assigned computing task according to the computer resource disparity, wherein the second route prioritizes the assigned computing task over autonomous movement of the first autonomous vehicle, and wherein one or more incentives are generated for the user for prioritizing the assigned computing task over the autonomous movement of the first autonomous vehicle.

2. The system of claim 1, wherein the processor is further configured to:
    assign, based on the set of computing resources of the set of autonomous vehicles, a second autonomous vehicle of the set of autonomous vehicles to performing a second computing task.

3. A computer program product, the computer program product comprising:
    one or more computer readable storage media; and
    program instructions collectively stored on the one or more computer readable storage media, the program instructions configured to:
        detect a computer resource disparity for performing a computing task, wherein the computer resource disparity is located proximate to a first location, wherein the computer resource disparity includes a lack of memory for processing by a client device;
        identify a set of one or more autonomous vehicles capable of being adjacent to the first location;
        generate, based on the first location and based on the computer resource disparity, an autonomous vehicle computing inquiry;
        transmit, based on the first location, the autonomous vehicle computing inquiry to a vehicle platform, wherein the vehicle platform is a central server of an autonomous vehicle manufacturer;
        receive, from the vehicle platform, in response to the autonomous vehicle computing inquiry, an autonomous vehicle status that includes a set of one or more computing resources of the set of autonomous vehicles; and
        assign, based on the set of computing resources of the set of autonomous vehicles, a first autonomous vehicle of the set of autonomous vehicles to perform the computing task, wherein a processor configured to assign the first autonomous vehicle to perform the computing task is further configured to:
            based on a determination the first autonomous vehicle is performing movement along a first route for a user riding in the first autonomous vehicle toward a second location, cause the first autonomous vehicle to reroute to travel along a second route that is located proximate to the first location to perform the assigned computing task according to the computer resource disparity, wherein the second route prioritizes the assigned computing task over autonomous movement of the first autonomous vehicle, and wherein one or more incentives are generated for the user for prioritizing the assigned computing task over the autonomous movement of the first autonomous vehicle.

4. The computer program product of claim 3, wherein the program instructions are further configured to:
    determine the first autonomous vehicle is leaving the first location; and assign, based on the set of computing resources of the set of autonomous vehicles, a second autonomous vehicle of the set of autonomous vehicles to perform the computing task.

5. The computer program product of claim 3, wherein the program instructions are further configured to:

determine, based on the autonomous vehicle status, no autonomous vehicles are adjacent to the first location;

generate, based on no autonomous vehicles are adjacent, an autonomous vehicle incentive; and transmit the autonomous vehicle incentive to the first autonomous vehicle of the set of autonomous vehicles.

6. The computer program product of claim 3, wherein the program instructions are further configured to:

detect, based on the computing task, a content request to navigate a content library;

determine, based on the content request, a subset of the content library stored on the first autonomous vehicle; and recommend, in response to the content request, the subset of the content library.

\* \* \* \* \*